March 26, 1968    E. C. PETRY    3,374,525
COMPONENT PLACEMENT APPARATUS
Filed Oct. 14, 1965    4 Sheets-Sheet 1

INVENTOR.
EDUARD C. PETRY
BY Braddock + Burd
ATTORNEYS

March 26, 1968 E. C. PETRY 3,374,525
COMPONENT PLACEMENT APPARATUS
Filed Oct. 14, 1965 4 Sheets-Sheet 2

INVENTOR.
EDUARD C. PETRY
BY
Braddock + Burd
ATTORNEYS

March 26, 1968 E. C. PETRY 3,374,525
COMPONENT PLACEMENT APPARATUS

Filed Oct. 14, 1965 4 Sheets-Sheet 3

INVENTOR.
EDUARD C. PETRY
BY Braddock+Burd
ATTORNEYS

United States Patent Office 3,374,525
Patented Mar. 26, 1968

3,374,525
COMPONENT PLACEMENT APPARATUS
Eduard C. Petry, Hopkins, Minn., assignor to Fabri-Tek Incorporated, Minneapolis, Minn., a corporation of Wisconsin
Filed Oct. 14, 1965, Ser. No. 496,028
18 Claims. (Cl. 29—203)

ABSTRACT OF THE DISCLOSURE

Magnetic core placement apparatus having a block including a pair of intersecting channels, one of the channels opening out of the block to receive cores, and the other channel opening out of the block at a different location for placement of the core. A fluid jet port is provided at a point between the channel intersection and the channel opening for placement. A plunger, including a magnetic tip for releasably holding the cores, is mounted within the placement channel, and is movable between the intersection and the jet port, so that on reciprocation of the plunger the magnetic tip carries a single magnetic core from the intersection to the jet port where the core is knocked off the magnetic tip by a fluid jet, to fall through the channel and out the placement opening. The apparatus is rotatably mounted to provide for programmed angular placement of the cores.

---

This invention is concerned with production apparatus, and more particularly with apparatus for the automatic placement of components in a predetermined configuration.

The use of production apparatus for the placement of components is wide-spread in contemporary industries. The needs for and advantages of such apparatus are well known to those skilled in the art, and includes the advantages of time saving and greater reliability through the relief of human error. A particular field where improved automatic component placement apparatus is badly needed, is the field of production of magnetic memory arrays. In such arrays small magnetic members, such as toroidal magnetic cores, are placed on a jig in various configurations for wiring. In many known methods of production, the placement of the cores is at least partly done by hand, which is both time consuming and open to statistically ever present human error. It is the purpose of this invention to provide for automatic placement of component parts such as toroidal magnetic cores in a variety of predetermined configurations, with a resulting increase in reliability of placement and savings in time of placement.

Briefly described, the apparatus of this invention comprises a rotatable pneumatic component gun, which works cooperatively with a jig holding table capable of rectilinear movement. A vibratory hopper is used to provide a seriate column of components to a delivery channel or bore in the component gun. The delivery channel intersects with a placement channel or bore also within the gun, the placement channel having at least one end that opens out of the gun. A pneumatic jet port is provided at a point intermediate the intersection of the two channels and the point where the placement channel opens out of the gun. A spring biased escapement plunger is normally biased to a position in which a magnetic tip at the end of the plunger catches the magnetizable components as they reach the intersection through the delivery channel. The dimensions of the channel and the placement of the plunger are such that no more than one component can enter the placement channel at a time. Apparatus is provided for actuating the plunger to carry the component on the magnetic tip to the jet port. Further apparatus is connected to the jet port to provide a pneumatic jet or blast to force the component through the placement channel and out of the gun for placement onto a jig held by the jig holding apparatus. Rotation of the component gun around its longitudinal axis varies the angular placement of the component on the jig, while rectilinear motion of the jig holding apparatus varies the rectilinear position of the component on the jig.

The acutation of the component gun ejection or placement apparatus, and the actuation of motion of the jig holding apparatus, is controlled by programmable control apparatus so that the components may automatically be placed in a predetermined configuration. The programmable control apparatus can provide for the placement of components in any of a plurality of angular displacements, in any position on the jig, or can provide for no component being placed in a particular position on the jig.

Figure 1:
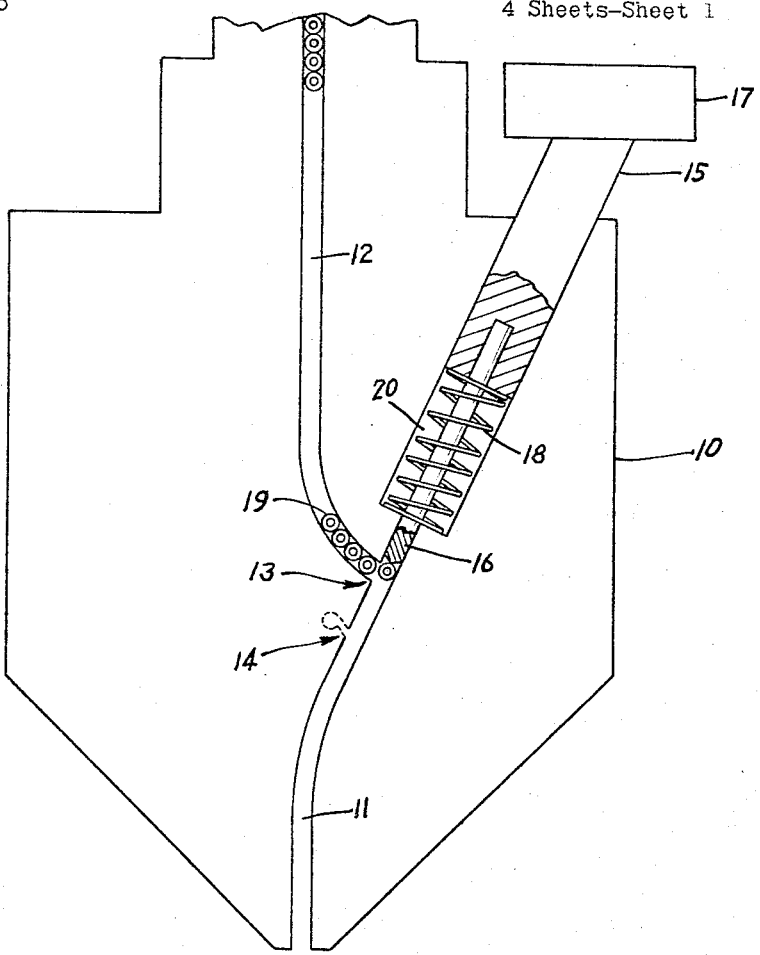
FIG. 1 is a plan sectional view of the pneumatic component gun used in an embodiment of this invention.

Referring first to FIG. 1 there is shown a block or gun 10. There is also shown a first channel or bore 11, hereinafter referred to as placement channel or ejection bore 11. Placement channel 11 has an ejection end opening out of gun 10. There is also shown a delivery channel or bore 12, which has an intersection 13 with channel 11. Bore 12 is designed to accept a seriate column of components 19 and deliver them seriately to intersection 13. Components 19 are here shown as a plurality of toroidal magnetic cores.

Also in gun 10 there is shown a cavity 20, in which is mounted a spring 18. A plunger 15 is also mounted in cavity 20, contiguous with spring 18. A component holding member, here shown as a magnetic tip 16, is mounted on plunger 15 and extends through spring 18 to intersection 13 for grasping components. When spring 18 is at equilibrium, tip 16 will grasp a component 19 delivered to intersection 13, and hold it there to prevent other components 19 from falling from channel 12 into channel 11. A head 17 is mounted on plunger 15, on which a pressure may be exerted to force plunger 15 against spring 20 to move magnetic tip 16 downwardly through ejection bore 11.

A fluid jet port 14 is shown located between intersection 13 and the ejection end of channel 11. When pressure is applied to plunger head 17, magnetic tip 16 will carry a component 19 to fluid jet port 14, where a fluid blast or jet will blow the component off tip 16 and through ejection bore 11 to be placed where desired. Upon removal of pressure from head 17, spring 20 will return plunger 15 to its original position, thus returning magnetic tip 16 back to intersection 13 to pick up another component 19. Note that when tip 16 is forced downward to be at jet port 14, components 19 are prevented by the body of tip 16 from entering channel 11.

Figure 2:
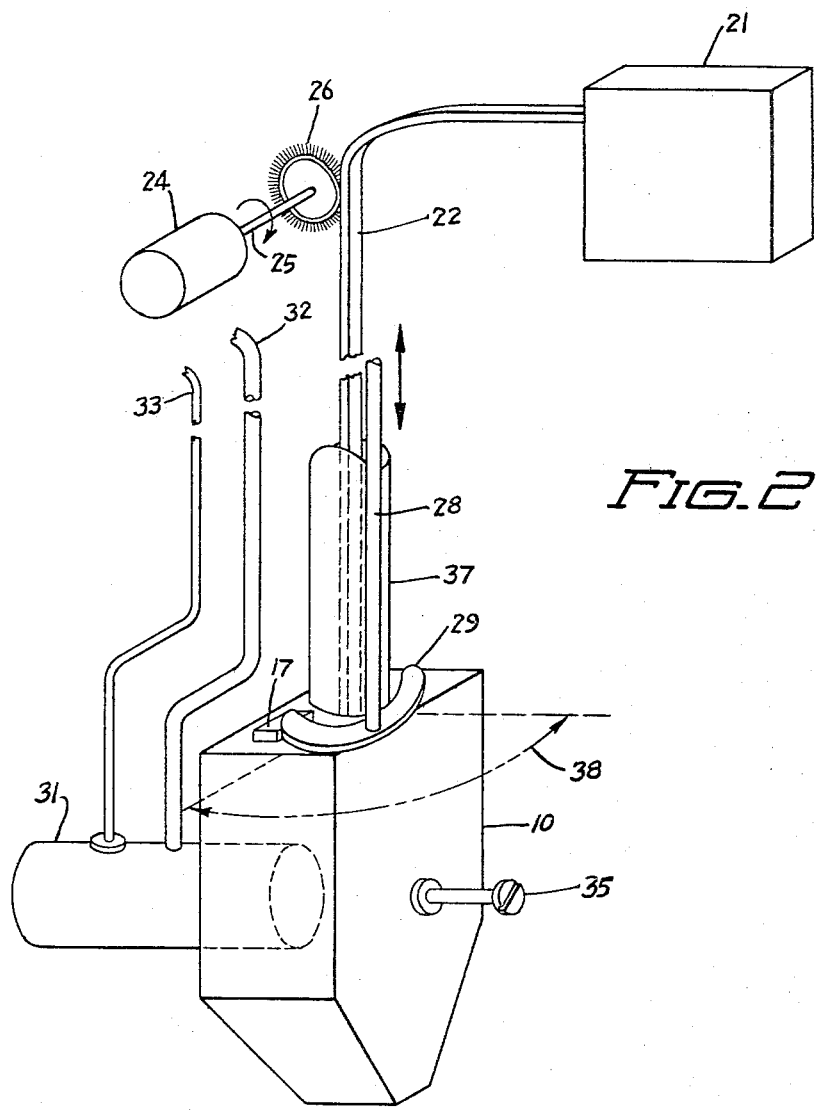
FIG. 2 is a perspective schematized view of the pneumatic component gun of this invention and associated apparatus for the delivery and ejection of components to and from the gun.

In FIG. 2 there is shown an external perspective view of gun 10. There is also shown a vibratory hopper 21 designed to seriately feed a plurality of components onto a track 22. Track 22 is in turn connected to delivery channel 12 within gun 10. There is also shown in representative form a motor 24 which turns a shaft 25 to rotate a brush 26 which aids the seriate movement of components along track 22.

Figure 3:
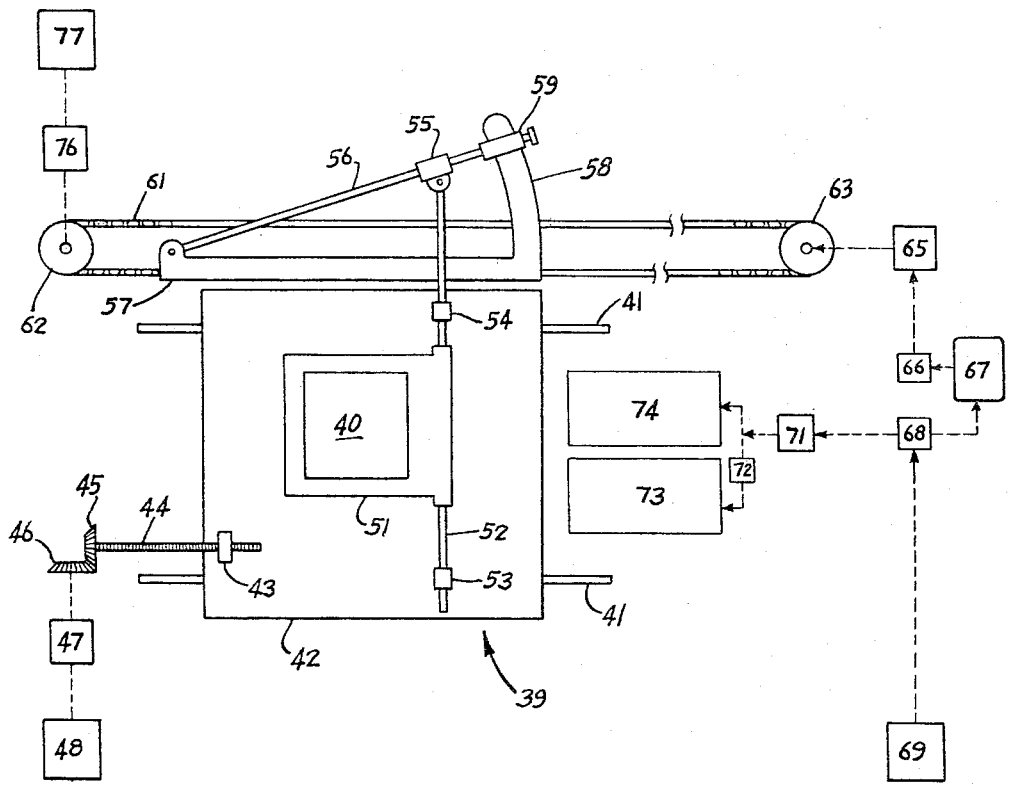
FIG. 3 is a top plan view of the jig holding apparatus of this embodiment of the invention, including a block diagram showing of the control apparatus therefor.

Contiguous with plunger head 17 there is shown a plunger shoe 29 connected to one end of a shaft 28 which is in turn connected to a component gun escapement drive 74 shown in FIG. 3. The motion of shaft 28 is in the direction of the vertical arrows. The gun 10 of the particular embodiment of the drawings is intended to rotate within the 90° arc indicated by dashed line 38. A shaft 37 connects gun 10 to component gun angular position control apparatus 73 shown and described in FIGS. 3 and 5. Shoe 29 is of a curved configuration to make contact with plunger head 17 despite the arcuate position of gun 10.

There is also shown in FIG. 2 a solenoid pneumatic valve 31. Valve 31 is adapted to be connected to jet port 14 shown in FIG. 1. A flexible connection 32 leads from solenoid valve 31 to a source of fluid under pressure (not shown). An electrical conductor 33 leads from valve 31 to a fluid jet actuation control (not shown). Upon actuation through conductor 33, valve 31 will open to allow a fluid blast to pass through jet port 14. The fluid jet can be controlled through a needle valve 35.

In FIG. 3 there is shown a jig holding apparatus 39 which operates cooperatively with gun 10 for the placement of components in a predetermined pattern on a jig 40. Jig 40 may take any one of a plurality of forms, including an adhesive faced base. Apparatus 39 includes a pair of X-axis rails 41, on which is mounted an X-axis plate 42. Mounted on plate 42 is a threaded member 43. Threaded through member 43 is an X-axis advance lead screw 44, which is in turn connected to a gear 45. Gear 45 is in contact with another gear 46, which is run through a clutch and brake mechanism 47 in turn run by an X-axis servo motor 48. Thus upon command from servo motor 48, clutch and brake 47 will turn gear 46 and gear 45 to advance or retract movements of plate 42 to vary the X-axis position of jig 40.

Also mounted on plate 42 are a pair of bearings 53 and 54 through which runs a Y-axis bar 52 on which is mounted a Y-axis plate 51. Bar 52 is pivotally connected at one end to a ball bushing 55. Running through bushing 55 is a rectilinear cam 56 pivotally mounted at one end to a member 57. Another end of rectilinear cam 56 is connected by a cam rise and Y-axis adjustment 59 to an upwardly extending curved arm 58 connected to member 57.

Member 57 is connected to a chain 61 which is connected between a pair of sprockets 62 and 63. Sprocket 62 is connected through a clutch 76 to a Y-axis return drive motor 77. Sprocket 63 is serially connected through a clutch 65, a set of reduction gears 66, a Geneva drive 67, and another set of reduction gears 68 to a main drive motor 69. Upon actuation of main drive motor 69, sprocket 63 will be rotated to move chain 61 and member 57. Motion of member 57 causes rectilinear cam 56 to operate on Y-axis plate 51 to vary the Y-axis position of jig 40. Also, actuation of Y-axis return drive motor 77 will rotate sprocket 62 to provide a return drive for chain 61, cam 56 and plate 51.

Actuation of main drive motor 69 will also be felt through reduction gears 68 and a clutch 71 to actuate a pneumatic component gun escapement drive 74, and to be felt through another reduction gear 72 to actuate a component gun angular position control apparatus 73.

Figure 4:
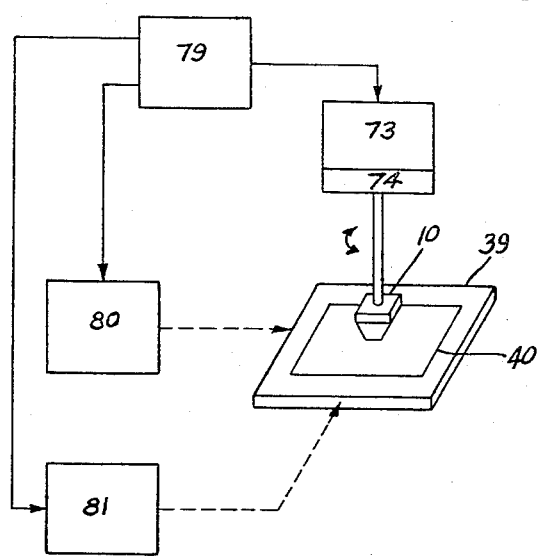
FIG. 4 is a functional block diagram of the overall system of this embodiment of the invention.

FIG. 4 discloses a block diagram of the interconnection of the system for placement of components in a predetermined configuration. Block 79 represents a timing and pattern control apparatus in which a predetermined configuration can be programmed for automatic placement of the components. This is the central control organ of this embodiment of the invention. From timing and pattern control apparatus 79, a signal is sent to a block 73 which represents the component gun angular position control, and to a block 74 which represents the component gun escapement drive 74, both of which are shown in FIG. 3. Thus the rotation of gun 10, and the actuation of plunger 15 are controlled by the timing and pattern control apparatus 79. Selectively and simultaneously the apparatus 79 sends control pulses to X-axis positioning equipment 80, and Y-axis positioning equipment 81, for proper rectilinear movement of jig holding apparatus 39, which is carrying jig 40 on which components are to be placed.

Figure 5:
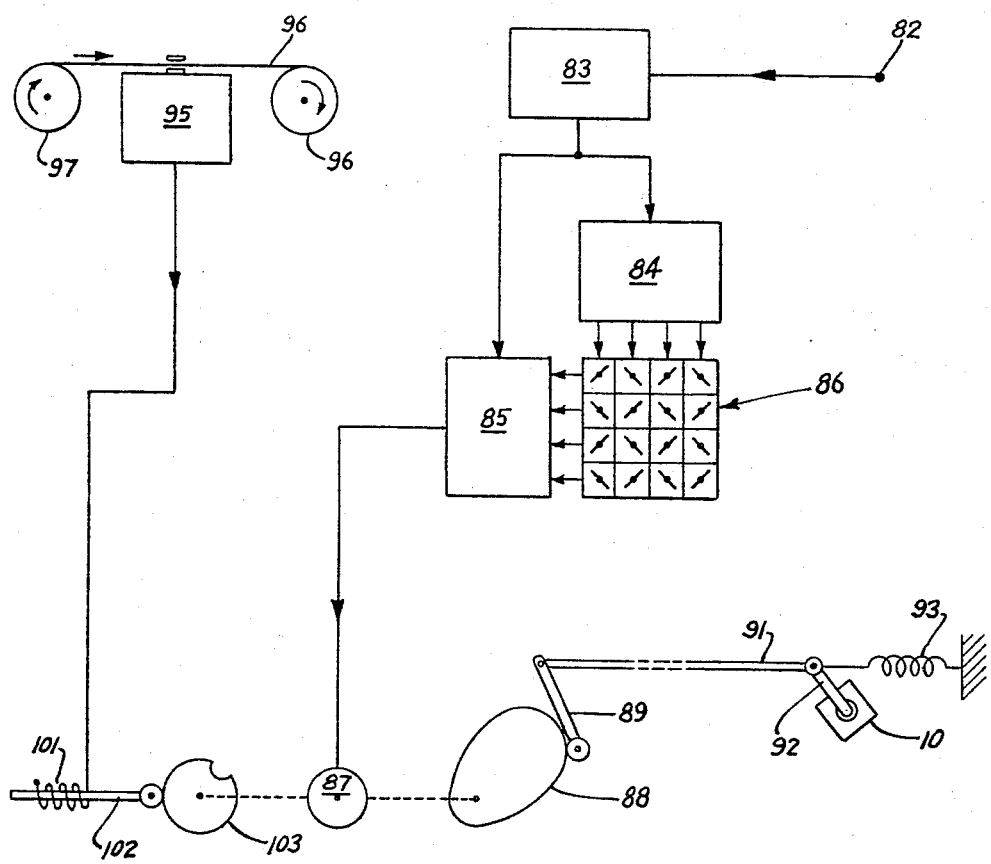
FIG. 5 is a drawing of the angular position control apparatus for the rotation of the component gun of this embodiment of the invention.

In FIG. 5 there is shown one embodiment of a portion of component gun angular positioning control 73. There is first shown an input 82 which can be a shaft input from reduction gears 72 of FIG. 3. This input will be felt by an electrical pulser 83, which will in turn send electrical pulses to a column selector 84 and a row selector 85. The pulses pass from column selector 84 into a plurality of position select switches 86 which are preset to determine the angular position at which it is desired to place the components. The pulses then selectively pass through the switches 86 and the now enabled row selector 85, to a torque motor 87. Depending on the prior position of gun 10, motor 87 will or will not be actuated by the pulse from the selector switches. If actuated it will rotate a cam 88, which motion would be impressed on a cam follower 89 to pass through a linkage 91 and an arm 92 to rotate gun 10 around its longitudinal axis to vary the angular displacement of components on jig 40. A spring 93 is shown connected to arm 92 for return of component gun 10 to its original position upon further rotation of cam 88.

In the embodiment here shown the position select switches 86 are settable so that components may be placed in two positions 90° apart. Therefore, the particular angular position control apparatus shown is for placing components in one of the two positions only. As it may be desirable to place components in other angular positions, additional apparatus is provided for this embodiment to enable placement of components in a position 45° from either of the two positions available from the selection switches. This additional apparatus takes the form of a tape reader 95 which reads a recording tape 96 as it travels between a supply reel 97 and a take-up reel 98. Tape 96 and reader 95 are synchronized with timing and pattern control apparatus 79, to provide a pulse from tape reader 95 when it is desired to place a component in the pattern at an angular displacement other than that enabled by selection switches 86. The pulse from reader 95 will actuate a solenoid 101 to extend a detent 102 to engage an interrupter cam 103 connected to torque motor 87. This will interrupt the movement of gun 10 along its arcuate path at a point midway between the two extremities, so that the next actuation of plunger 15 will cause a component to be laid at an angle which will be 45° from each of the two normal positions. As it is necessary for gun 10 to be in motion for the interrupter cam to be turning, the programmer must initially set the position select switch 86 for the desired 45° placement to select a position opposite to that of the previously placed component.

At this time it is desirable to give a summary of the operation of the apparatus of this invention, with reference to all the drawings. Initially, a programmer may insert a program for a predetermined pattern or configuration of components into the timing and pattern control apparatus 79. Actuation of apparatus 79 will then cause cyling of the X and Y-axis positioning equipment of jig holding apparatus 39, to move X-axis plate 42 and Y-axis plate 51 simultaneously or selectively to position jig 40 under gun 10. At the same time, apparatus 79 will cause an arcuate rotation of pneumatic component gun 10 around its longitudinal axis to vary the angular placement of components on jig 40. Thus the rectilinear motion of the jig holding apparatus and the arcuate rotation of the placement gun cooperate to achieve the predetermined pattern.

While jig holding apparatus 39 and gun 10 are being moved to the proper positions, vibratory hopper 21 is providing a seriate column of components to track 22, for entrance into delivery channel or bore 12 of gun 10. Thus a seriate column of components 19 will always be waiting at intersection 13 within gun 10, and one of components 19 will be held within channel 11 by magnetic tip 16. When jig holding apparatus 39 and gun 10 are in the proper position, escapement drive apparatus 74 will be actuated to force shoe 29 downward, thus pushing against plunger head 17 to depress plunger 15 against spring 18. This will cause magnetic tip 16 to carry a component 19 through channel 11 to jet port 14.

When tip 16 has carried a component 19 to jet port 14, escapement drive apparatus 74 will actuate solenoid 31 to allow a fluid blast to pass through flexible connection 32 to port 14, where the fluid jet will cause ejection of component 19 through channel 11 and onto jig 40. Escapement drive apparatus 74 will then release shoe 29 and spring 18 will return plunger 15 to its original position, thus reciprocating magnetic tip 16 back to intersection 13 to pick up another component 19 for placement. Jig holding apparatus 39 and gun 10 will then be re-positioned and the cycle repeated until the desired pattern of components has been placed.

Angular placement of the components on jig 40 can be controlled by apparatus such as shown in FIG. 5 and explained above, or by other suitable apparatus for synchronously controlling the arcuate position of gun 10. If it is desired that no components be placed at a particular rectilinear position on jig 40, then either the actuation of solenoid pneumatic valve 31 or the actuation of plunger 15 can be negated at that position, causing failure of an ejected component.

The specific embodiment here shown is suitable for the placement of magnetic cores in a magnetic memory array. Use of the position select switches of FIG. 5 for placement of cores at angular variances of 90°, or an interim 45°, allows a programming of the device for producing over 65,000 patterns for each 4 x 4 unit of 16 memory cores. Once a plurality of cores have been placed in vibratory hopper 21, and a program entered into timing and pattern control apparatus 79, the entire placement of cores is automatic, and repeatable. This allows for a great savings in time, as prior art methods of producing magnetic core arrays involve a great deal of hand labor, and also allows an increase in reliability with the elimination of human error.

It will be apparent from the foregoing that other embodiments of this invention can be mechanized in manners other than that particularly shown in the drawings and described above, without departing from the spirit of the invention.

The embodiments of the invention in which an exclusive property or privilege is claimed are defined as follows:

1. Magnetic component placement apparatus comprising:
   a component placement block;
   a component placement channel formed within said block and having one end opening out of said block;
   a component delivery channel formed within said block and intersecting said placement channel;
   a fluid jet port opening into said placement channel at a point between said intersection and said one end of said placement channel;
   magnetic component holding means mounted for longitudinal movement within said placement channel and including a magnetic member for releasably holding magnetic components;
   means for reciprocally moving said component holding means within said placement channel at least from said intersection to said fluid jet port;
   means for providing a fluid jet to said fluid jet port; and
   means for inserting components into said delivery channel to be held at said intersection by said holding means magnetic member and carried by reciprocation thereof to said fluid jet port and forced by a fluid jet from said holding means and through said one end of said placement channel for placement.

2. The apparatus of claim 1 in which said means for reciprocally moving said component holding means comprises a plunger having a magnetic tip and yieldingly biased away from said fluid jet port and said intersection, and means for forcing said plunger through said placement channel toward said intersection and said port.

3. The apparatus of claim 1 in which said component placement block is rotatably mounted to means for rotating said block, for varying the angular displacement of components being placed; said means for rotating said block being connected to data control means for placing the components in a programmed configuration.

4. In magnetic core placement apparatus in which a plurality of magnetic cores are seriately fed from a hopper to be arranged on core winding jigs, the improvement for automatically placing the seriately fed cores onto the winding jigs, comprising:
   a pneumatic core gun;
   a first bore formed in said gun and having a core ejecting end for ejecting cores onto the winding jig;
   a second bore formed in said gun and having an intersection with said first bore, said second bore connected to the hopper for seriately feeding cores to said intersection;
   a pneumatic jet port formed in said gun and opening into said first bore at a point between said intersection and the core ejection end of said first bore;
   pneumatic control means connected to said jet port for forcing a pneumatic jet therethrough;
   plunger means mounted on said gun and extending into said first bore, a portion of said plunger means including means for releasably holding cores; and
   actuating means connected to said plunger means for driving said means for releasably holding cores through said first bore between said intersection and said jet port, whereby the cores are sequentially carried by said plunger from said intersection to said jet port to be pneumatically ejected from said core gun.

5. The improvement for automatically placing cores of claim 4 in which said means for releasably holding cores includes a magnetic tip, and in which said portion of said plunger means includes a member for preventing movement of the cores from the second bore into the first bore when said plunger means is driven toward said jet port.

6. The improvement for automatically placing cores of claim 4 including means for yieldingly biasing said plunger means away from said jet port to return said means for releasably holding cores to said intersection following each ejection of a core.

7. The improvement for automatically placing cores of claim 4 including means connected to said core gun for rotating said core gun to vary the angular position of ejected cores on the winding jig.

8. The improvement for automatically placing cores of claim 4 including means connected to the winding jig to synchronously move the jig with each desired core ejection to vary the position of the ejected cores on the jig.

9. Apparatus for automatically placing magnetizable components comprising:
   a component feeder including a component track onto which components are seriately fed;
   a component gun including an ejection bore and a feed bore, said feed bore opening into said ejection bore;
   means connecting said track to said feed bore to seriately feed components through said feed bore to said ejection bore;

a fluid jet port opening into said ejection bore at a point between where said feeder bore opens into said ejection bore and the point of component ejection from said gun;

an escapement plunger spring mounted in said gun and having one end external to said gun and another end extending into said ejection bore, the bias of the spring mounting being toward said one end, said another end includes a magnetic tip for holding components;

reciprocating means including an escapement plunger shoe adapted to contact said one end of said escapement plunger to force said another end of said plunger toward said fluid jet port, to carry a component from said feed bore opening to said jet port;

fluid jet actuating means connected to said jet port and synchronized with said escapement plunger shoe to provided a fluid jet at said port after arrival of a component at said port, for ejecting the component through said ejection bore and from said gun; and a portion of said escapement plunger preventing the feeding of components from said feeder bore into said ejection bore during reciprocation of said escapement plunger.

10. The apparatus of claim 9 including means connected to said gun for rotating said gun around its longitudinal axis for varying the angular placement of the ejected components.

11. The apparatus of claim 9 including a table adapted to carry a component jig on which the gun places the components; and means for imparting rectilinear motion to said table, the motion being synchronous with component ejections from said gun for arranging the components on the jig in a predetermined pattern.

12. The combination for automatic placement of magnetic cores comprising:
core feeder apparatus for providing a seriate column of cores;
automatic core ejection apparatus connected to said feeder apparatus for receiving the column of cores;
jig holding apparatus for holding a jig onto which the cores are to be ejected from said ejection apparatus; and
programmable control apparatus connected to said ejection apparatus and said jig holding apparatus, and adapted to impart motion to said ejection and jig holding apparatus for arranging ejected cores on said jig in a pattern dictated by a predetermined program.

13. The combination of claim 12 in which the motion imparted to said ejection apparatus is rotational around the axis of ejection; and the motion imparted to said jig holding apparatus is rectilinear in a plane transverse to the axis of ejection.

14. The combination of claim 12 in which said automatic core ejection apparatus comprises:
a member having a first bore and second bore meeting at an intersection;
a pneumatic jet port in said second bore;
means connecting said first bore to said core feeder apparatus for feeding the seriate column of cores to said second bore at said intersection;
means within said member and actuated by said programmable control apparatus for picking up a single core at said intersection and translating the core to said jet port; and
pneumatic jet forming means actuated by said programmable control apparatus and connected to said jet port for providing a pneumatic jet to eject the core from said member through said second bore.

15. The combination of claim 12 in which said programmable control apparatus comprises:
first means for imparting arcuate motion of said core ejection apparatus around the axis of ejection for varying the angular placement of ejected cores;
second means for imparting rectilinear motion to said jig holding apparatus in a plane transverse to the axis of ejection, for varying the relative position of ejected cores on the jig;
timing and pattern control means for providing control pulses; and
means connecting said timing and pattern control means to said first and second means to provide control pulses thereto for synchronously moving said ejection and jig holding apparatus to place cores in a predetermined configuration on the jig.

16. The combination of claim 15 in which said first means comprises:
pivot means pivotally mounting said ejection apparatus for arcuate movement around the axis of ejection;
a first arm having one end connected to said pivot means;
a motor including a cam and means connecting said motor to said timing and pattern control means for providing control pulses to said motor;
a cam follower contiguous with said cam; and
linkage means linking said cam follower to another end of said first arm for imparting arcuate motion to said ejection apparatus due to controlled motion of said motor.

17. The combination of claim 16 including inhibit means connected to said timing and pattern control means and said motor for selectively inhibiting arcuate motion of said ejection apparatus.

18. The combination of claim 15 in which said second means comprises:
first translation means mounted on said jig holding apparatus for translation thereof in a first direction;
second translation means mounted on said jig holding apparatus for translation thereof in a second direction;
said first and second translation means adapted to simultaneously and selectively move said jig holding apparatus in the first and second directions;
means connecting said first translation means to said timing and pattern control means; and
means connecting said second translation means to said timing and pattern control means.

References Cited
UNITED STATES PATENTS

| | | | |
|---|---|---|---|
| 1,164,086 | 12/1915 | Gooding | 227—113 |
| 2,696,285 | 12/1954 | Zenlea | 193—43 |
| 3,169,308 | 2/1965 | Goran | 29—429 |

THOMAS H. EAGER, *Primary Examiner.*